United States Patent [19]
Bange et al.

[11] Patent Number: 5,520,957
[45] Date of Patent: May 28, 1996

[54] METHOD OF PREPARING A COATED ABRASIVE ARTICLE

[75] Inventors: Donna W. Bange, Eagan; Jens L. Jorgensen, Ham Lake; Richard V. Kopel, Woodbury; Stephen J. Yoos, Andover, all of Minn.

[73] Assignee: Minnesota Mining and Manufacturing Company, St. Paul, Minn.

[21] Appl. No.: 471,652

[22] Filed: Jun. 6, 1995

Related U.S. Application Data

[62] Division of Ser. No. 831,085, Feb. 5, 1992, which is a continuation of Ser. No. 476,354, Feb. 7, 1990, abandoned, which is a continuation-in-part of Ser. No. 407,967, Sep. 15, 1989, abandoned.

[51] Int. Cl.$^6$ .................................................. B05D 5/10
[52] U.S. Cl. ...................... 427/208.8; 427/180; 427/203; 427/355; 427/385.5; 427/387
[58] Field of Search ............................ 427/180, 203, 427/208.8, 355, 387, 385.5

[56] References Cited

U.S. PATENT DOCUMENTS

| | | | |
|---|---|---|---|
| 2,286,208 | 6/1942 | Kirchner | 451/538 |
| 2,544,940 | 3/1951 | Ritterbusch et al. | 15/230.19 |
| 2,888,785 | 6/1959 | Kellican et al. | 451/538 |
| 3,849,949 | 11/1964 | Steinhauser et al. | 451/538 |
| 3,875,703 | 4/1975 | Clemente | 451/359 |
| 3,922,464 | 11/1975 | Silver et al. | 428/355 |
| 3,959,935 | 6/1976 | Stoppacher | 451/527 |
| 4,240,807 | 12/1980 | Kronzer | 51/295 |
| 4,460,371 | 7/1984 | Abber | 424/448 |
| 4,835,217 | 5/1989 | Jorgensen et al. | 525/93 |

FOREIGN PATENT DOCUMENTS

| | | |
|---|---|---|
| 2418700 | 9/1979 | France . |
| 964961 | 7/1964 | United Kingdom . |

*Primary Examiner*—Bernard Pianalto
*Attorney, Agent, or Firm*—Gary L. Griswold; Walter N. Kirn; Doreen S. L. Gwin

[57] ABSTRACT

A coated abrasive product having a backing bearing abrasive grains on one major surface thereof and a pressure-sensitive adhesive, coatable from water, on the other major surface thereof. The pressure-sensitive adhesive can be used to secure the coated abrasive to a support pad or back-up pad. The support pad provides the coated abrasive with the necessary foundation during abrading operations. The pressure-sensitive adhesives of this invention can adequately secure the coated abrasive to the support pad even at high rotation speeds and at high grinding pressures. Previously known pressure-sensitive adhesives for coated abrasives that are coatable from water were unable to provide this property.

8 Claims, 1 Drawing Sheet

METHOD OF PREPARING A COATED ABRASIVE ARTICLE

This is a division of application Ser. No. 07/831,085 filed Feb. 5, 1992, which is a continuation of application Ser. No. 07/476,354 filed Feb. 7, 1990 (now abandoned), which is a continuation-in-part of application Ser. No. 07/407,967 filed Sept. 15, 1989 (now abandoned).

BACKGROUND OF THE INVENTION

1. Field of the Invention

This invention relates to a coated abrasive product having a pressure-sensitive adhesive layer coatable from water.

2. Discussion of the Art

Many coated abrasive products, especially coated abrasive sheets and discs, are mounted on a support pad, sometimes called a back-up pad, during use. The purpose of the support pad is to provide the coated abrasive with the necessary foundation required for a particular abrading application. For example, if the coated abrasive article is to be employed at high pressure, e.g., for high stock removal applications, the support pad will typically be durable, heat resistant, and rigid. If the coated abrasive article is to be employed for finishing contoured surfaces, the support pad will typically be soft and conformable.

One means for securing the coated abrasive article to the support pad calls for a pressure-sensitive adhesive. Typically, the surface of the coated abrasive article not containing the abrasive grains will bear a layer of pressure-sensitive adhesive. The pressure-sensitive adhesive of this layer must have sufficient adhesion to hold the coated abrasive article on the support pad for the intended abrading application. In some cases, the coated abrasive/support pad assembly rotates as many as 15,000 rpm. If the pressure-sensitive adhesive does not have sufficient adhesion, the coated abrasive article can fly off the support pad at high rotation speeds, thereby resulting in excessive downtime.

A wide variety of pressure-sensitive adhesives have been utilized with coated abrasive products in the past. U.S. Pat. No. 2,286,208 discloses coated abrasive products having several different types of solvent-based pressure-sensitive adhesives. These pressure-sensitive adhesives include ethyl cellulose adhesives, alkyd resins, rubber-based adhesives, and rosin-based adhesives.

U.S. Pat. No. 2,544,940 discloses a polishing pad for use with loose abrasive grain. The polishing pad is adhered to a support pad by a natural, synthetic, or chlorinated rubber.

U.S. Pat. No. 2,888,785 discloses a coated abrasive that is adhered to a support pad by a rubber-based pressure-sensitive adhesive.

U.S. Pat. No. 3,849,949 discloses a convolutely wound roll of coated abrasives, each of which contains a pressure-sensitive adhesive coating on the non-abrasive side. In one embodiment, the pressure-sensitive adhesive is a water-based acrylate adhesive.

U.S. Pat. No. 3,875,703 discloses a coated abrasive disc that is adhered to a support pad by a rubber-based latex adhesive.

For many years, pressure-sensitive adhesives have been coated from organic solvent solutions onto the non-abrasive side of the coated abrasive article with excellent results. However, because recent governmental regulations require reductions in solvent emissions, the coated abrasive industry should eliminate all organic solvents from their coating operations. Accordingly, it would be desirable to replace pressure-sensitive adhesives coated from organic solvents with pressure-sensitive adhesives coated from water. In some applications, especially those involving high rotation speeds and high grinding pressures, currently available pressure-sensitive adhesives coated from water do not exhibit sufficient adhesion to consistently prevent abrasive discs from flying off support pads. Accordingly, for some products, the coated abrasive industry is forced to rely on pressure-sensitive adhesives coated from organic solvents in order to obtain the required adhesive properties.

SUMMARY OF THE INVENTION

This invention relates to a coated abrasive article having a backing bearing abrasive grains on one major surface thereof and a pressure-sensitive adhesive, coatable from water, on the other major surface thereof. The pressure-sensitive adhesive can be used to secure the coated abrasive article to a support pad or back-up pad. The support pad provides the coated abrasive article with the necessary foundation during abrading operations.

In one embodiment of the invention, the pressure-sensitive adhesive comprises a water-emulsifiable, tacky adhesive formed from a copolymer of vinyl acetate and at least one terminally unsaturated vinyl monomer.

In another embodiment of the invention, the pressure-sensitive adhesive comprises (a) a first component comprising a water-emulsifiable, tacky adhesive selected from the group consisting of (i) rubber-based adhesives, (ii) silicone-based adhesives, (iii) polyvinyl acetate-based adhesives, and (iv) copolymer formed from vinyl acetate and at least one terminally unsaturated vinyl monomer; and (b) a second component comprising a water-emulsifiable acrylic adhesive.

Either of the foregoing embodiments provide a high-performance pressure-sensitive adhesive that can be successfully employed with coated abrasive articles. The aforementioned pressure-sensitive adhesives can adequately secure the coated abrasive article to a support pad even at high rotation speeds and at high grinding pressures. Previously known pressure-sensitive adhesives for coated abrasives that were coated from water were unable to provide this property.

The aforementioned pressure-sensitive adhesives provide sufficient adhesive strength to secure coated abrasive articles having a cloth backing to a support pad. Because cloth-backed coated abrasive products usually have more mass associated with them than do paper-backed coated abrasive products of lighter weight, pressure-sensitive adhesives for cloth-backed products must have adhesive properties superior to those of pressure-sensitive adhesives for paper-backed products of lighter weight. Previously known pressure-sensitive adhesives coated from water for cloth-backed coated abrasive articles did not exhibit sufficient adhesive properties to assure that the coated abrasive article would not separate from the support pad during use.

BRIEF DESCRIPTION OF THE DRAWING

The FIGURE is a section view of a coated abrasive article having a layer of pressure-sensitive adhesive on one major surface thereof.

DETAILED DESCRIPTION

Figure 1:
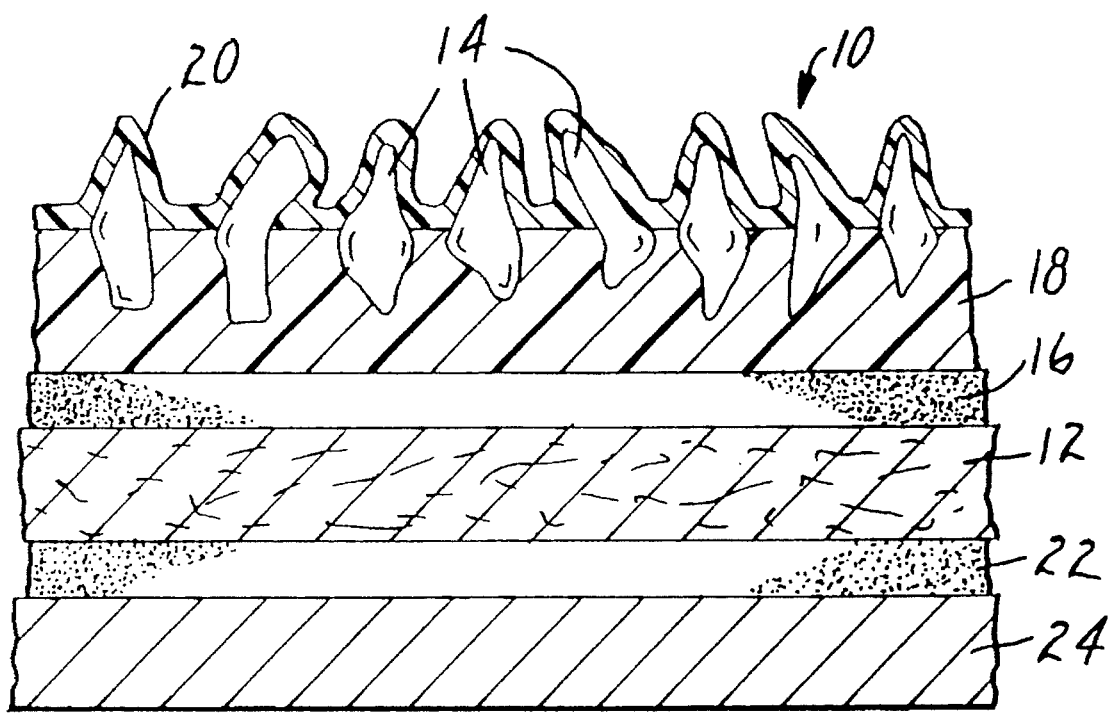

Referring to the FIGURE, coated abrasive article 10 comprises a backing 12 bearing on one major surface thereof a layer of abrasive grains 14. Backing 12 is preferably formed from paper, cloth, polymeric film, vulcanized fiber, non-woven material, woven material, or combinations thereof. The backing can be treated or remain untreated. For example, as shown in the FIGURE, backing 12 bears a treatment or coating commonly referred to as a presize. Abrasive grains 14 are preferably made of material selected from the group consisting of aluminum oxide, ceramic aluminum oxide, alumina zirconia, silicon carbide, flint, garnet, diamond, and mixtures thereof. Other commonly known abrasive grains can also be used. Typically, abrasive grains 14 are secured to backing 12 by a first adhesive layer or binder layer 18, commonly referred to as the "make coat". Another adhesive layer or binder layer 20 can be applied over the abrasive grains. Layer 20 is commonly referred to as the "size coat". Layer 20 provides additional reinforcement for abrasive grains 14. Common adhesives and binders for layers 18 and 20 include phenol-formaldehyde, melamine-formaldehyde, urea-formaldehyde, glue, starch, epoxy resins, acrylate resins, latices, and combinations and mixtures thereof. The coated abrasive article need not have both a make coat and size coat; instead, the abrasive grains can be mixed with an adhesive or binder and then applied to the backing as a slurry. The abrasive grains are then secured to the backing by a single adhesive or binder layer. A layer of pressure-sensitive adhesive suitable for use in this invention 22 is borne on the major surface of backing 12 not bearing abrasive grains 14. In addition, coated abrasive article 10 may contain an optional liner 24 over layer 22 of pressure-sensitive adhesive. Liner 24 typically consists of paper or polymeric film having a coating of a low adhesion material that is in direct contact with layer 22 of pressure-sensitive adhesive. Examples of such low adhesion materials are polyethylene, silicones, and high molecular weight waxy materials.

The pressure-sensitive adhesive of layer 22 must meet at least four major criteria. These criteria are tack, peel strength, removal, and shear strength.

Tack is the ability of an adhesive to adhere quickly to a surface; with respect to the present invention, it is a measure of the initial contact between the coated abrasive article and the support pad. The pressure-sensitive adhesive must have sufficient tack over a wide range of temperatures and humidities, because coated abrasive articles are used throughout the world in both indoor and outdoor environments. In other words, the pressure-sensitive adhesive of layer 22 must be tacky. The term "tacky", as used herein, means having a sticky nature or immediate adhesion on contact with a substrate. Some adhesives are inherently tacky while others can be rendered tacky by addition of a tackifier. The term "tacky" is intended to refer to both inherently tacky adhesives and adhesive compositions that include an added tackifier.

Peel strength is a measure of the ability of a pressure-sensitive adhesive to resist removal by being peeled away from a surface, and is also a measure of how well the pressure-sensitive adhesive bonds to a surface, e.g., a support pad.

Removal is a measure of the ability of the coated abrasive article to be cleanly removed from the support pad. Peel strength and removal are competing properties. Pressure-sensitive adhesives useful in this invention must have sufficiently high peel strength so that the coated abrasive article will not come off of the support pad during use. However, if the peel strength is too high, the operator cannot remove or cleanly remove the coated abrasive article from the support pad when the abrasive grains have been consumed without tearing the backing. After the coated abrasive article is worn, it is discarded, but the support pad is used many times over. If the peel strength of the pressure-sensitive adhesive is too great, residual pressure-sensitive adhesive may remain on the surface of the support pad when the coated abrasive article is removed. Over time, this build-up of residual pressure-sensitive adhesive will become unacceptable and render the support pad useless. Also, if the peel strength of the pressure-sensitive adhesive is too great, there is a tendency for the pressure-sensitive adhesive to stick to the support pad when the coated abrasive article is removed, and, consequently, the paper backing of the coated abrasive article may delaminate, thereby rendering the support pad useless. This is a serious problem because support pads are generally much more expensive than are coated abrasive articles.

Shear strength is a measure of the ability of a pressure-sensitive adhesive to cause the article it is bonding to remain in its initial position when shear forces are applied. Shear forces are applied to the coated abrasive article/support pad assembly from both rotating and grinding. If the pressure-sensitive adhesive does not have sufficient shear strength, the coated abrasive article will fly off the support pad during use and cause inconvenience to the operator. Both the mass and the Young's modulus for a coated abrasive article and a support pad are different. Because of this disparity, the torque caused by the rotating and the grinding forces each affect the coated abrasive article and support pad differently. These forces can lead to the separation of the coated abrasive article from the support pad. Accordingly, the pressure-sensitive adhesive must have sufficient shear strength to resist the separation of the coated abrasive article from the support pad caused by these forces. Grinding also results in generation of heat. In general, as the temperature increases, the shear strength of pressure-sensitive adhesives decreases. Because the temperature that the pressure-sensitive adhesive may experience can exceed 100° C. under severe grinding conditions, the pressure-sensitive adhesive should have sufficient shear strength under elevated temperatures to secure the coated abrasive to the support pad.

In general, the higher the coating weight of the pressure-sensitive adhesive, the higher will be the tack and peel strength and the lower will be the shear strength thereof. Thus, for each coated abrasive article product and grade, the coating weight of the adhesive layer must be optimized.

In one embodiment of this invention, the pressure-sensitive adhesive comprises a water-emulsifiable, tacky adhesive comprising a copolymer of vinyl acetate and at least one terminally unsaturated vinyl monomer. As used herein, the term "copolymer" means a composite polymer prepared by the polymerization of a mixture of two or more monomers, or of a monomer and polymer of low molecular weight. An example of a pressure-sensitive adhesive of this type has the trade designation "Flexcryl 1625" and is commercially available from Air Products Company. Representative examples of terminally unsaturated vinyl monomers include isooctyl acrylate, ethyl acrylate, isobutyl acrylate, isononyl acrylate, 2-ethyl hexyl acrylate, and methyl methacrylate. The emulsifier for this adhesive can be anionic, non-ionic, or combinations of both, depending on the particular system. Anionic emulsifiers are preferred because they tend to produce more stable emulsions. An example of an anionic emulsifier has the trade designation "Triton X-200" and an example of a non-ionic emulsifier has the trade designation "Triton X-100", both of which are commercially available from Rohm and Haas Company.

In another embodiment of this invention, the pressure-sensitive adhesive comprises (a) a first component comprising a water-emulsifiable, tacky adhesive selected from the group consisting of (i) rubber-based adhesives, (ii) silicone-based adhesives, (iii) polyvinyl acetate-based adhesives, and (iv) a copolymer formed from vinyl acetate and at least one terminally unsaturated vinyl monomer and (b) a second component comprising a water-emulsifiable acrylic adhesive.

Examples of rubber-based adhesives suitable for the first component include thermoplastic elastomers, such as, for example, styrene-butadiene-styrene, styrene-isoprene-styrene, and styrene-ethylene/butylene-styrene. Representative examples of commercially available adhesives include the styrene-isoprene-styrene elastomer "Kraton 1107" and the styrene-ethylene/butyl-styrene elastomer "Kraton 1657" both of which are available from Shell Chemical Company. Examples of silicone-based adhesives include silicone elastomers or gums. The silicone elastomers or gums are typically provided as solvent solutions of elastomer or gum and MQ resin, such as, for example, that described in U.S. Pat. No. 4,460,371, incorporated herein by reference (especially column 5, line 47 through column 7, line 26, thereof). Representative examples of silicone elastomers have the trade designation "Silgrip PSA 595", "Silgrip PSA 596", and "Silgrip PSA 6574" all of which are available from General Electric Company.

The adhesives of the first component can be tackified by (a) incorporation of a tackifying agent, (b) appropriate modification of the structure of the adhesive molecule, or (c) a combination of both approaches. Tackifiers that have been found to be suitable for tackifying the pressure-sensitive adhesive of the first component include low molecular weight hydrocarbon resins, and alpha- and beta-pinene based resins. Representative examples of commercially available tackifiers include the resins having the trademarks "Regalrez 1018" and "Regalrez 1078", both of which are available from Hercules Incorporated, "Exxon ECR 111", "Exxon ECR 327", and "Exxon ECR 328" all of which are available from Exxon Corporation, and "Wingtack Plus", which is available from Firestone Tire and Rubber Company. The ratio of tackifier to adhesive in the first component preferably ranges from about 0.5:1.0 to about 1.5:1.0.

A preferred method of preparing the rubber-based, silicone-based, and polyvinyl acetate-based adhesives for the first component of the second embodiment is described below. A solution containing the emulsifiable, tacky adhesive is prepared by combining the following ingredients in the amounts indicated:

| Ingredient | Amount (parts by weight) |
| --- | --- |
| Adhesive | 100 |
| Solvent | Sufficient to make a solution comprising from about 5 to 80% by weight solids |
| Tackifier (if required) | Up to about 250 |
| Antioxidant | Up to about 1 |

It is preferred that the solvent used to dissolve the adhesive of the first component have low polarity and low hydrogen bonding. As polarity of the solvent increases, it tends to mix with the water utilized to prepare an aqueous emulsion and emulsion stability may be impaired. The solvent is preferably selected from the group consisting of toluene, xylene, naphtha, heptane, methylene chloride, and mixtures thereof.

The resulting solution can then be converted into an emulsion by the addition of from about 10 to 70 parts by weight water and from about 0.25 to about 10 parts by weight surfactant. It is preferred that the water used to form the emulsion be deionized, because deionized water provides greater emulsion stability. A portion of the water, preferably no more than about 25% by weight, can be replaced by alcohol, e.g., monohydric alcohol having 1 to 6 carbon atoms. It is necessary to convert the solution containing the adhesive to an emulsion so that it can be readily combined with the second component, which is typically provided in the form of an emulsion. Preferably, the solution is premixed with non-ionic surfactant, and the water is premixed with anionic surfactant before the solution is combined with the water to form the emulsion. For example, for each 100 parts by weight adhesive solution, about 0.55 part by weight non-ionic surfactant is typically added to the adhesive solution, and for each 20 parts by weight water, 0.28 part by weight anionic surfactant is typically added to the water.

A small amount of anionic surfactant can be used to replace a larger amount non-ionic surfactant, with the result that the total amount of surfactant needed is reduced. Up to 50% by weight of non-ionic surfactant can be replaced by a lesser percentage by weight of anionic surfactant. For example, if one part by weight of non-ionic surfactant were normally required, 0.5 part by weight of non-ionic surfactant could be replaced by less than 0.5 part by weight of anionic surfactant. A non-ionic surfactant suitable for the present invention has the trade designation "Triton X-100" and an anionic surfactant suitable for the present invention has the tradename "Triton X-200", both of which are commercially available from Rohm and Haas Company. The amount of surfactant must not be so high that it will adversely affect the tack, peel strength, and shear strength of the pressure-sensitive adhesive.

The second component comprises a water-emulsifiable acrylic adhesive. Examples of acrylic adhesives suitable for this invention are disclosed in Silver, U.S. Pat. No. 3,922,464, incorporated herein by reference (see column 3, line 28 through column 4, line 2 of U.S. Pat. No. 3,922,464). Representative examples of monomers that can be used to make acrylic adhesives include isooctyl acrylate, 2-ethyl hexyl acrylate, methyl methacrylate, and isononyl acrylate. The acrylic adhesives can be modified with various components such as N-tert-octylacrylamide, N-tert-butylacrylamide, N-tert-amylacrylamide, N-isopropylacrylamide, carboxylic acids, acrylates, methacrylates, and others as are known in the art.

A preferred method of preparing the water-emulsifiable acrylic adhesive is described below. The acrylic-based monomer is dispersed in water with an appropriate emulsifier. This dispersion may contain modifiers, such as, for example, anti-oxidants, inorganic fillers, thixotropic agents, stabilizers, and dyes. Examples of such additives can be found in U.S. Pat. No. 4,835,217, incorporated hereinafter by reference (see especially col. 7, line 25 through col. 8, line 4 of U.S. Pat. No. 4,835,217). After the dispersion is formed, the monomer, and optional modifiers, if any, are then polymerized. It is preferred that the water used to form the emulsion be deionized, as deionized water provides greater emulsion stability. The emulsifier can be anionic, non-ionic, or combinations of both, although anionic is preferred because it tends to provide better emulsion stability. An example of an anionic emulsifier has the trade designation "Triton X-200" and an example of a non-ionic emulsifier has the trade designation "Triton X-100" both of which are commercially available from Rohm & Haas Company.

It is preferred that the emulsifier for the second component be a vinyl-unsaturated polymerizable monomer. This monomer can then copolymerize with the other acrylic monomer of the second component. This monomer must have both hydrophobic and hydrophilic moieties, contain at least 5 but not more than 40 carbon atoms, and be water dispersible. Preferably, the monomer comprises a monovalent salt of a styrene sulfonate such as that disclosed in U.S. Pat. No. 4,835,217, previously incorporated herein by reference (see column 4, lines 54 to 68 and column 5, lines 1 to 15 of U.S. Pat. No. 4,835,217).

The emulsifier can also be formed from a vinyl-unsaturated polymerizable monomer and a zwitterion monomer. The vinyl-unsaturated monomer must have both hydrophobic and hydrophilic moieties, contain at least 5 but not more than 40 carbon atoms, and be water dispersible. The zwitterion monomer has a free radically polymerizable unsaturated group. This copolymer is described more in detail in U.S. Pat. No. 3,922,464.

The aqueous emulsion of the first component is then combined with the aqueous emulsion of the second component to form the pressure-sensitive adhesive of the second embodiment of the invention. The ratio of first component to second component in the pressure-sensitive adhesive of the second embodiment, based on weight, preferably ranges from about 5:1 to about 1:5, and more preferably ranges from 1:1 to 1:5. Ratios outside of these ranges can also be used to prepare useful pressure-sensitive adhesives for coated abrasive articles.

Some water emulsifiable acrylic adhesives are shear sensitive. If the adhesive is shear sensitive, as in the case of the acrylic adhesive described in U.S. Pat. No. 4,835,217, care must be taken during processing to avoid coagulation. For example, if the water emulsifiable acrylic adhesive is mixed with other adhesives, the duration of mixing and the speed of the mixing apparatus should not be excessive in order to avoid coagulation. The duration of mixing is typically less than 60 minutes, preferably less than 20 minutes.

After the pressure-sensitive adhesive is prepared, it is coated on the major surface of the coated abrasive article not bearing abrasive grains. During the coating process, the adhesive is preferably not pumped to the coating station; instead, it is preferred that the adhesive be gravity fed to avoid coagulation. This coating can be applied by any method typically used in the art, such as, for example, roll coating, knife coating, spraying, or die coating. After the layer of pressure-sensitive adhesive is coated, the resulting coated abrasive article is heated from about three minutes to about 10 hours at 25° C. to 80° C. to dry the adhesive.

It has been found that immediately after the adhesive has been roll coated onto the backing, a smoothing blanket should be employed to smooth out the adhesive to prevent the coating from developing a ridge-like pattern. If a ridge-like pattern were to form, the adhesion to the support pad would be poor. Typically, the smoothing blanket can be formed from a polymeric film, such as polyester film, having a low adhesion coating, such as a silicone material, on the side that contacts the adhesive. The length of the smoothing blanket is determined by the width of the backing and the speed of the coater. The smoothing blanket should not be excessively long. If it were too long, it would act as a knife and stick to the adhesive. Additionally, there would be an undesirable build-up of frictional force between the adhesive coated web and the smoothing blanket.

The coating weight of the adhesive has a significant effect on the drying time, i.e., the lower the coating weight, the shorter the drying time. It is preferred that the adhesive be dried at between 25° C. and 35° C. for approximately 60 minutes to 120 minutes to allow the adhesive to penetrate into the backing. Then the adhesive is preferably dried for 30 minutes to 150 minutes at between 30° C. to 35° C. If the temperature is too high, e.g., greater than 60° C., blistering may occur and the top surface of the adhesive will be dried, while the back of the adhesive will not be dried.

The weight of the adhesive should be sufficiently high to provide sufficient adhesive strength to hold the coated abrasive to the support pad under high rotational speeds, but it should not be so high that the coated abrasive cannot be readily removed from the support pad once the coated abrasive needs to be replaced.

Next, the coated abrasive article can be converted into a wide variety of different forms such as discs, sheets, rolls, and cones.

In some cases, the major surface of the coated abrasive article not bearing abrasive grains may be primed or coated with another material prior to the application of the layer of pressure-sensitive adhesive. This priming or additional coating enhances the adhesion between layer 22 of pressure-sensitive adhesive and backing 12.

The blend of the two components in the second embodiment provides an adhesive that exhibits the necessary properties for a coated abrasive. The first component acts to provide good shear strength and water resistance. The second component acts to provide good peel strength over a wide temperature range.

As indicated previously, the pressure-sensitive adhesive of this invention may also include such additives as antioxidants, inorganic fillers, thixotropic agents, stabilizers, and dyes. Examples of such additives can be found in U.S. Pat. No. 4,835,217, incorporated hereinafter by reference (see column 7, lines 25 to 68 and column 8, lines 1 to 4 of that patent).

The following non-limiting examples will further illustrate the invention. The tests that were used to determine various properties of the following examples are described below.

Wet Test

The Wet Test simulated the effect of water on the pressure-sensitive adhesive during sanding or grinding operations. Each coated abrasive sample was converted to a 7.6 cm diameter disc. In water, the disc was pressed against a 7.6 cm diameter rubber support pad. The coated abrasive sample/support pad assembly was used to sand a gelcoat plastic for two minutes. The initial and final adhesion between the coated abrasive sample and the support pad was noted. A rating system was used in which a rating of 1 meant that there was no adhesion between the pressure-sensitive adhesive and the support pad, a rating of 2 meant that there was poor adhesion between the pressure-sensitive adhesive and the support pad, a rating of 3 meant that there was adequate adhesion between the pressure-sensitive adhesive and the support pad, and a rating of 4 meant that there was good adhesion between the pressure-sensitive adhesive and the support pad.

Random Orbital Test

This test simulated dry sanding conditions carried out with a random orbital sander. The purpose of the test was to determine if any pressure-sensitive adhesive transferred to the support pad after the coated abrasive article was removed from it. The coated abrasive article from each example was converted to a 12.7 cm diameter disc and was pressed against a 12.7 cm diameter vinyl support pad attached to a random orbital sander. Next, the coated abrasive article was used to sand an edge (approximately 0.7 cm thick) of a plastic/fiberglass composite panel for approximately two minutes. After the sanding, the coated abrasive article was removed and the amount of adhesive transfer to the support pad was determined. A rating system was developed in which a rating of 1 meant that there was no initial adhesion between the layer of pressure-sensitive adhesive and the support pad. A rating of 2 meant that there was good adhesion between the layer of pressure-sensitive adhesive and the support pad, but when the coated abrasive article was removed, an undesirable amount of adhesive remained on the support pad. A rating of 3 meant that there was good adhesion between the layer of pressure-sensitive adhesive and the support pad, but when the coated abrasive article was removed, a small amount of adhesive remained on the support pad. A rating of 4 meant that there was good adhesion between the layer of pressure-sensitive adhesive and the support pad, and when the coated abrasive article was removed, no visible adhesive remained on the support pad.

Fly-Off Test

The coated abrasive article was converted to a 7.6 cm diameter disc and pressed against a 7.6 cm butyl rubber support pad that was attached to an air grinder. The coated abrasive disc/support pad assembly rotated at 15,000 rpm. The coated abrasive disc was used to grind the welds and corners of cold-rolled steel for one minute. This test was considered to be a severe grinding test and measured how well the coated abrasive disc remained on the support pad during grinding operations. A rating system was developed in which a rating of 0 meant that the coated abrasive disc flew off, indicating a complete failure, a rating of 1 meant that adhesion between the coated abrasive disc and the support pad was poor, a rating of 2 meant that adhesion between the coated abrasive disc and the support pad was fair and the disc barely passed the test, a rating of 3 meant that there was good adhesion between the coated abrasive disc and the support pad, a rating of 4 meant that there was excellent adhesion between the coated abrasive disc and the support pad, and a rating of 5 meant that there was superb adhesion between the coated abrasive disc and the support pad.

Lap Shear Test

This test provided an indication of relative shear strength of different adhesives. Each coated abrasive article from each example was converted to strips 2.54 cm wide. The adhesive bearing side of each strip of each coated abrasive article of each example was pressed onto a vinyl backing by means of a 2.0 kg roller. A vinyl backing was used to simulate the support pad. An "Instron" testing apparatus was used to pull the strip of each example apart from the vinyl backing at a rate of 13 cm/min. The angle between the strip of each example and the vinyl backing throughout the test was maintained close to 0°. The peak load was measured. In general, the higher the lap shear value, the greater is the shear strength.

Adhesive Transfer Test

This test provided an indication of how well the layer of pressure-sensitive adhesive adheres to the backing of the coated abrasive article. The coated abrasive article of each example was converted to strips 2.54 cm wide. A commercially available adhesive tape, #396, Minnesota Mining and Manufacturing Company, St. Paul, Minn., was pressed over the layer of pressure-sensitive adhesive of each strip of each coated abrasive article of each example by means of 2.0 kg roller. An "Instron" testing apparatus was employed to pull the strip of #396 tape apart from the strip of each example at a rate of 51 cm/min. The angle between the strips of #396 tape and each coated abrasive article throughout the test was maintained near 90° The force to separate the #396 adhesive tape from the layer of pressure-sensitive adhesive of each coated abrasive article was measured. In this type of test, a failure occurred when the #396 adhesive tape removed the pressure-sensitive adhesive from the backing of the coated abrasive article. The force and failure mode was then recorded.

Peel Test

This test measured the relative peel strengths of pressure-sensitive adhesives of the coated abrasive articles. The coated abrasive article of each example was converted to strips 2.5 cm wide. A coated abrasive strip was then pressed against a 2.54 cm wide vinyl strip by means of a 2.0 kg roller. The vinyl strip simulated a support pad. An "Instron" testing apparatus was employed to pull the vinyl strip apart from the strip of each example at a rate of 51 cm/min. The angle between the strips of vinyl and each coated abrasive article throughout the test was maintained near 90°. The average peak force required to separate the vinyl strip from the layer of pressure-sensitive adhesive of each coated abrasive article was measured and recorded.

Cold Temperature Tack Test

This test measured the adhesion between the pressure-sensitive adhesive and a butyl rubber support pad at cold temperatures. Coated abrasive discs (7.6 cm diameter) along with the butyl rubber support pad (7.6 cm) were stored in a cooler set at 3° C. for 24 hours. Then the disc was pressed against the support pad and the initial adhesion was noted. A rating system was developed in which a rating of 1 meant that there was no adhesion between the coated abrasive disc and the support pad, a rating of 2 meant that adhesion between the coated abrasive disc and the support pad was poor, a rating of 3 meant that adhesion between the coated abrasive disc and the support pad was fair, a rating of 4 meant that adhesion between the coated abrasive disc and the support pad was good, a rating of 5 meant that adhesion between the coated abrasive disc and the support pad was very good, and a rating of 6 meant that adhesion between the coated abrasive disc and the support pad was excellent.

Comparative Example A

A solvent-based pressure-sensitive adhesive was coated onto the major surface of the backing not bearing abrasive grains of a grade 320 "Tri-M-ite" "Wetordry" paper Type W2 commercially available from the Minnesota Mining and Manufacturing Company, St. Paul, Minn. The coating was applied by means of a knife coater, and the adhesive was gravity fed into the knife coater. The adhesive consisted essentially of isooctyl acrylate:acrylic acid copolymer. The coated abrasive article was subjected to the Wet Test and the test results are set forth in Table I.

Comparative Example B

The coated abrasive article of this example was prepared and tested in the same manner as that of Comparative Example A, except that a different adhesive was used. The adhesive was a rubber-based, water-emulsifiable, tacky adhesive prepared according to Example 1 of U.S. Pat. No. 4,835,217. The coated abrasive article was subjected to the Wet Test and the test results are set forth in Table I.

Example 1

The coated abrasive article of this example was prepared and tested in the same manner as that of Comparative Example A, except that a different adhesive was used. The adhesive was a blend of a water-emulsifiable acrylic adhesive (3 parts) with a rubber-based, water-emulsifiable tacky adhesive (1 part). The water-emulsifiable acrylic adhesive was prepared according to U.S. Pat. No. 4,835,217 (see column 10, U.S. Pat. No. 4,835,217, "Preparation of Second Component".) The rubber-based, water-emulsifiable adhesive was the same adhesive as that used in Comparative Example B. The coated abrasive article was subjected to the Wet Test and the test results are set forth in Table I.

TABLE I

| Example | Initial adhesion | Final adhesion |
| --- | --- | --- |
| Comparative A | 2 | 1 (The disc came off the support pad during sanding.) |
| Comparative B | 1 | The disc could not be used for sanding. |
| 1 | 4 | 4 |

The data in Table I show that the blend of the rubber-based, water-emulsifiable adhesive with a water-emulsifiable acrylic adhesive provided a pressure-sensitive adhesive for coated abrasives that had improved wet properties.

Example 2 to 8

Examples 2 to 8 (along with Example 1) compare the results obtained from the use of various ratios of the water-emulsifiable, acrylic adhesive to the water-emulsifiable, rubber-based adhesive. For Examples 2 through 8, the coated abrasive articles were prepared in the same manner as that of Example 1, except for the differing ratios of adhesive components. The coated abrasive articles from the examples were evaluated under the Wet Test and the Random Orbital Test. The adhesive component ratios and results are set forth in Table II.

TABLE II

| Example | Amount (parts by weight) acrylic | rubber | Wet test | Random orbital test |
| --- | --- | --- | --- | --- |
| 2 | 1 | 1 | 2 | 3 |
| 3 | 2 | 1 | 2 | 3 |
| 1* | 3 | 1 | 4 | 4 |
| 4 | 4 | 1 | 4 | 4 |
| 5 | 5 | 1 | 4 | 4 |
| 6 | 1 | 2 | 1 | 2 |
| 7 | 1 | 3 | 1 | 2 |
| 8 | 1 | 4 | 3 | 1 |

*Example 1 is included in Table II in order to compare the effectiveness of the coated abrasive article therein with those of Examples 2–8.

The data of Table II show that the preferred ratio of water-emulsifiable acrylic adhesive to the rubber-based, water-emulsifiable adhesive was between 3 to 1 and 5 to 1. In all cases, the coated abrasive article adhered to the vinyl support pad and remained on the support pad throughout the test.

Comparative Examples C and D and Examples 9 to 14

These examples compare the performance of various pressure-sensitive adhesives under the test procedures designated as Fly-off Test, Lap Shear Test, Adhesive Transfer Test, Peel Test, and Cold Temperature Tack. The test results are set forth in Tables III and IV.

Comparative Example C

The coated abrasive article of Comparative Example C was a grade 36 "Three-M-ite" Resin Bond Cloth, X weight PSA, pressure-sensitive adhesive-coated abrasive commercially available from the Minnesota Mining and Manufacturing Company, St. Paul, Minn. The pressure-sensitive adhesive that had been previously coated on the surface of the backing not bearing abrasive grains of the coated abrasive was a rubber-based adhesive coated from a solvent. The cloth backing was primed prior to application of the adhesive.

Comparative Example D

A water-emulsifiable acrylic-based pressure-sensitive adhesive was coated on the surface of the backing not bearing abrasive of a grade 36 "Three-M-ite" Resin Bond Cloth, X weight, coated abrasive article commercially available from the Minnesota Mining and Manufacturing Company, St. Paul, Minn. The coating weight was 162 g/m$^2$ This particular adhesive was shear sensitive; therefore the adhesive could not be pumped. The adhesive was first poured into a coating trough. The adhesive was then applied with a roll coater, and immediately after application, a smoothing blanket smoothed out the adhesive across the web. The smoothing blanket was a polyester film bearing a low surface energy coating made of silicone on the side that contacted the adhesive. This coated abrasive article differed from the coated abrasive article of Comparative Example C in that it did not bear the rubber-based adhesive, coated from a solvent, that was described in that example. The water-emulsifiable acrylic-based adhesive was prepared according to U.S. Pat. No. 4,835,217 (see column 10, U.S. Pat. No. 4,835,217, "Preparation of Second Component"). After the adhesive had been coated, the adhesive was dried in an oven at 25° C. for 25 to 30 minutes and at 50° C. for 40 minutes.

Example 9

The coated abrasive article of this example was prepared in the same manner as that of Comparative Example D, except that a different adhesive was employed. The adhesive consisted of a water-emulsifiable, tacky copolymer of vinyl acetate and at least one terminally unsaturated vinyl monomer. The adhesive had the trade designation "Flexcryl 1625", and was commercially available from Air Products Company. It is believed that "Flexcryl 1625" adhesive is an anionically stabilized blend of ethylhexyl acrylate (77 percent by weight), methylmethacrylate (15 percent by weight), and vinyl acetate (8 percent by weight). The adhesive was dried at 30° C. for 7 minutes and at 50° C. for 40 minutes.

Example 10

The coated abrasive article of this example was prepared in the same manner as that of Example 9, except that the adhesive consisted of a 75% by weight "Flexcryl 1625" adhesive and 25% by weight of an acrylic adhesive such as that described in Comparative Example D.

Example 11

The coated abrasive article of this example was prepared in the same manner as that of Example 10, except that the ratio, based on weight, between the two adhesives was 60% by weight "Flexcryl 1625" adhesive and 40% by weight acrylic adhesive.

Example 12

The coated abrasive article of this example was prepared in the same manner as that of Example 10, except that the ratio, based on weight, between the two adhesives was 50% by weight "Flexcryl 1625" adhesive and 50% by weight acrylic adhesive.

Example 13

The coated abrasive article of this example was prepared in the same manner as that of Example 10, except that the ratio, based on weight, between the two adhesives was 40% by weight "Flexcryl 1625" adhesive and 60% by weight acrylic adhesive.

Example 14

The coated abrasive article of this example was prepared in the same manner as that of Example 10, except that the ratio, based on weight, between the two adhesives was 25% by weight "Flexcryl 1625" adhesive and 75% by weight acrylic adhesive.

TABLE III

| Example | Adhesive coating weight (g/mm$^2$) | Fly-Off Test | Lap Shear Test (kg) |
|---|---|---|---|
| Comparative C | 1.5 | 4 | 9.76 |
| Comparative D | 2.4 | 2.25 | 17.3 |
| 9 | 2.6 | 5 | 14.5 |
| 10 | 2.9 | 4.5 | 17.3 |
| 11 | 1.8 | 3.25 | 18.2 |
| 12 | 2.5 | 3 | 19.5 |
| 13 | 2.2 | 2.25 | 20.0 |
| 14 | 2.2 | 4 | 15.9 |

TABLE IV

| Example | Adhesive Transfer Test (kg) | Peel Test (kg) | Cold Temperature Tack Test |
|---|---|---|---|
| Comparative C | 8.0 | 0.95 | 5 |
| Comparative D | 6.0 | 0.95 | 3 |
| 9 | 8.4 | 2.2 | 6 |
| 10 | 7.3 | 1.7 | 3 |
| 11 | 6.4 | 1.3 | 5 |
| 12 | 5.0 | 1.3 | 3.5 |
| 13 | 6.1 | 1.3 | 4 |
| 14 | 6.3 | 1.2 | 4 |

In the Adhesive Transfer Test, none of the pressure-sensitive adhesives came apart (delaminated) from the coated abrasive backing, thereby indicating that there was adequate adhesion between the pressure-sensitive adhesive and the cloth backing.

various modifications and alterations of this invention will become apparent to those skilled in the art without departing from the scope and spirit of this invention, and it should be understood that this invention is not to be unduly limited to the illustrative embodiments set forth herein.

What is claimed is:

1. Method of preparing a coated abrasive article containing a pressure-sensitive adhesive, the method comprising:

(1) providing a coated abrasive article having a backing bearing on one major surface thereof a layer of abrasive grains, said abrasive grains adhered to said backing by at least one binder, (2) providing a pressure-sensitive adhesive comprising a water emulsifiable, tacky adhesive formed from a copolymer of vinyl acetate and at least one terminally unsaturated vinyl monomer;

(3) coating said adhesive onto a major surface of said backing not bearing said layer of abrasive grains;

(4) smoothing said coated adhesive sufficiently to prevent formation of a pattern of ridges in the coating; and (5) drying said coated adhesive.

2. The method according to claim 1 wherein said smoothing is carried out by means of a smoothing blanket.

3. Method of preparing a coated abrasive article containing a pressure-sensitive adhesive, the method comprising:

(1) providing a coated abrasive article having a backing bearing on one major surface thereof a layer of abrasive grains, said abrasive grains adhered to said backing by at least one binder, (2) providing a pressure-sensitive adhesive comprising (a) a first component comprising a water-emulsifiable, tacky adhesive selected from the group consisting of: (i) rubber-based adhesives, (ii) silicone-based adhesive, (iii) polyvinyl acetate-based adhesives, and (iv) a copolymer formed from vinyl acetate and at least one terminally unsaturated vinyl monomer; and (b) a second component comprising a water-emulsifiable acrylic adhesive, the ratio of said adhesive of said second component to said adhesive of said first component being from 3 to 1 to 5 to 1;

(3) coating said adhesive onto a major surface of said backing not bearing said layer of abrasive grains;

(4) smoothing said coated adhesive sufficiently to prevent formation of a pattern of ridges in the coating; and (5) drying said coated adhesive.

4. The method according to claim 3 wherein said smoothing is carried out by means of a smoothing blanket.

5. Method of preparing a coated abrasive article containing a pressure-sensitive adhesive, the method comprising:

(1) providing a coated abrasive article having a backing bearing on one major surface thereof a layer of abrasive grains, said abrasive grains adhered to said backing by at least one binder, (2) providing a pressure-sensitive adhesive comprising (a) a first component comprising a water-emulsifiable, tacky adhesive selected from the group consisting of: (i) rubber-based adhesives, (ii) silicone-based adhesives, (iii) polyvinyl acetate-based adhesives, and (iv) a copolymer formed from vinyl acetate and at least one terminally unsaturated vinyl monomer, and (b) a second component comprising a copolymeric adhesive formed from: (i) a water-emulsifiable acrylic adhesive; and (ii) at least one vinyl-unsaturated, polymerizable monomer having both a hydrophobic and hydrophilic moiety, containing at least 5 but not more than 40 carbon atoms, and being water dispersible, the ratio of said adhesive of said second component to said adhesive of said first component being from 3 to 1 to 5 to 1;

(3) coating said adhesive onto a major surface of said backing not bearing said layer of abrasive grains;

(4) smoothing said coated adhesive sufficiently to prevent formation of a pattern of ridges in the coating; and (5) drying said coated adhesive.

6. The method according to claim 5 wherein said smoothing is carried out by means of a smoothing blanket.

7. Method of preparing a coated abrasive article containing a pressure-sensitive adhesive, the method comprising:

(1) providing a coated abrasive article having a backing bearing on one major surface thereof a layer of abrasive grains, said abrasive grains adhered to said backing by at least one binder, (2) providing a pressure-sensitive adhesive comprising (a) a first component comprising a water-emulsifiable, tacky adhesive selected from the group consisting of: (i) rubber-based adhesives, (ii) silicone-based adhesives, (iii) polyvinyl acetate-based adhesives, and (iv) a copolymer formed from vinyl acetate and at least one terminally unsaturated vinyl monomer; and (b) a second component comprising a copolymeric adhesive formed from: (i) a water-emulsifiable acrylic adhesive, (ii) at least one vinyl-unsaturated polymerizable monomer having both a hydrophobic and hydrophilic moiety, containing at least 5 but not more than 40 carbon atoms, and being water dispersible, and (iii) at least one zwitterion monomer having a free-radically polymerizable unsaturated group, the ratio of said adhesive of said second component to said adhesive of said first component being from 3 to 1 to 5 to 1;

(3) coating said adhesive onto a major surface of said backing not bearing said layer of abrasive grains;

(4) smoothing said coated adhesive sufficiently to prevent formation of a pattern of ridges in the coating; and (5) drying said coated adhesive.

8. The method according to claim 7 wherein said smoothing carried out by means of a smoothing blanket.

* * * * *